I. N. MITCHELL.
ENGINE REVERSE GEAR.
APPLICATION FILED NOV. 30, 1912.

1,085,463.

Patented Jan. 27, 1914.

2 SHEETS—SHEET 1.

Witnesses
B. F. Brown
J. F. Burch

Inventor
I. N. Mitchell
by Chandler & Chandler
Attorneys.

COLUMBIA PLANOGRAPH CO., WASHINGTON, D. C.

I. N. MITCHELL.
ENGINE REVERSE GEAR.
APPLICATION FILED NOV. 30, 1912.
1,085,463.
Patented Jan. 27, 1914.
2 SHEETS—SHEET 2.
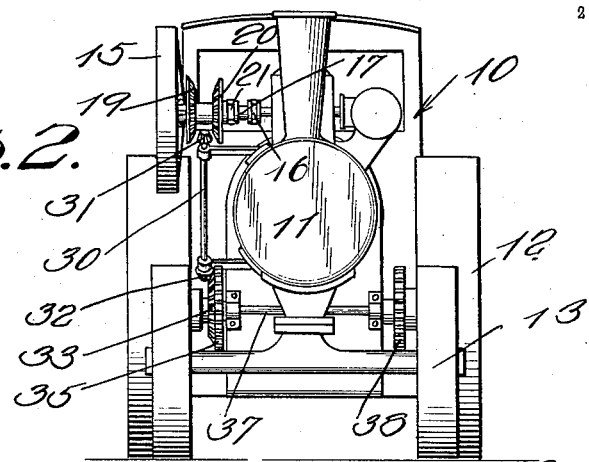
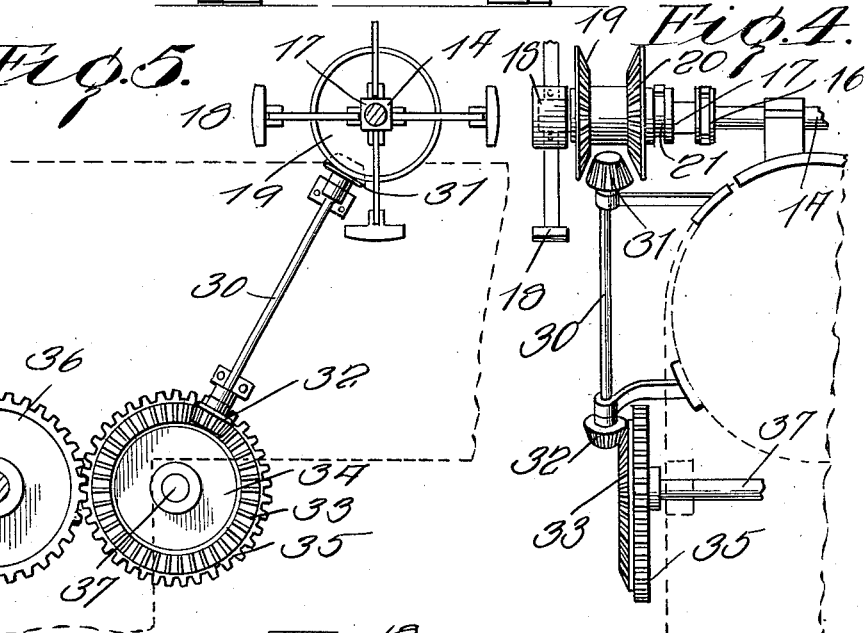
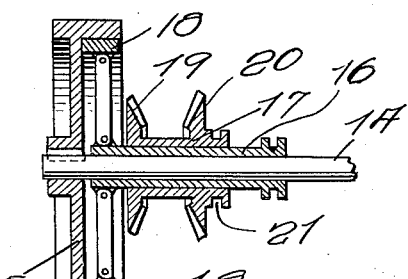
Witnesses
B. F. Brown
J. E. Burch
Inventor
I. N. Mitchell
by Chandler & Chandler
Attorneys
COLUMBIA PLANOGRAPH CO., WASHINGTON, D. C.

UNITED STATES PATENT OFFICE.

IRA N. MITCHELL, OF WELLAND JUNCTION, ONTARIO, CANADA.

ENGINE-REVERSE GEAR.

1,085,463.   Specification of Letters Patent.   Patented Jan. 27, 1914.

Application filed November 30, 1912. Serial No. 734,298.

*To all whom it may concern:*

Be it known that I, IRA N. MITCHELL, a subject of the King of England, residing at Welland Junction, in the Province of Ontario, Dominion of Canada, have invented certain new and useful Improvements in Engine-Reverse Gears; and I do hereby declare the following to be a full, clear, and exact description of the invention, such as will enable others skilled in the art to which it appertains to make and use the same.

This invention relates to engine gears and more particularly to reversing gears for engines, the device consisting of means whereby a machine, such as a traction engine or automobile, or in fact any similar drive mechanism can be propelled, forwardly or backwardly without changing the direction of rotation of the fly wheel of the engine.

With the above and other objects in view, the invention resides more particularly in the peculiar combination and arrangements of parts as will be partly illustrated in the accompanying drawings and described in the specification, although the invention is protected for all desirable changes and uses within the scope of the invention as claimed.

Figure 1:
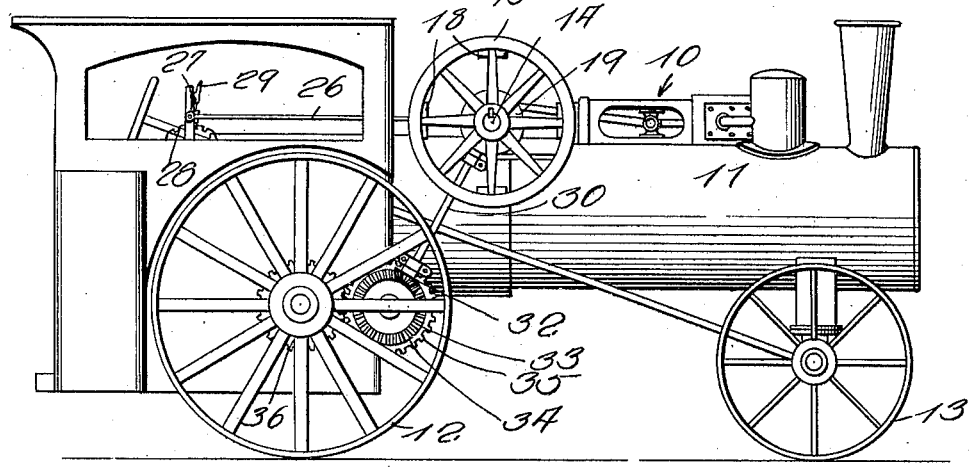
Figure 3:
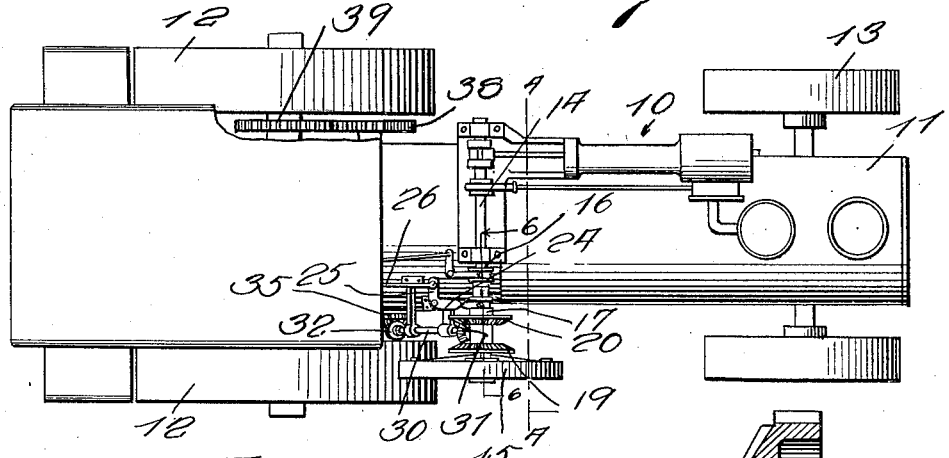
Figure 8:
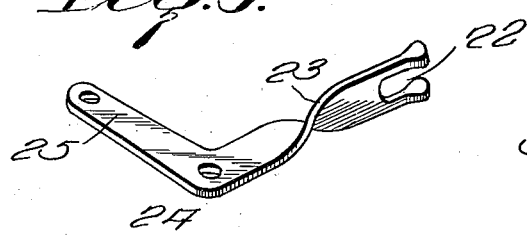
Figure 7:
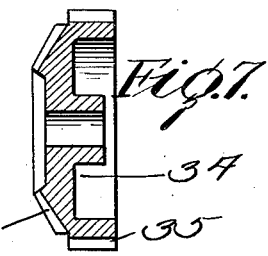

Figure 1 is a side elevation of a portion of a traction engine having the invention applied thereto. Fig. 2 is an end elevation thereof. Fig. 3 is a top plan view. Fig. 4 is a cross sectional view taken on the line 4—4 of Fig. 3. Fig. 5 is a vertical longitudinal sectional view showing the gearing in side elevation. Fig. 6 is a detail view of the reversing gears. Fig. 7 is a detail sectional view of a peculiar gear wheel employed with the device. Fig. 8 is a detail perspective view of a shifting lever also employed with the device.

For purposes of illustrating the preferred embodiment of the invention, a traction engine 10 is indicated, the same comprising a boiler portion 11 supported upon the ground wheels 12 and 13 respectively. The rear wheels 12 are used for driving purposes and front wheels 13 for steering purposes, motion being imparted to the ground wheels 12 through the medium of a drive shaft 14 mounted in bearings on the top of the boiler. At one end of the shaft 14 is a fly wheel 15, the adjacent end of the shaft 14 carrying a clutch sleeve 16 and having engaged thereon a sleeve 17 having a squared bore so that it will rotate with the sleeve 16 which has a squared cross sectional outline and be permitted to slide thereon. This sleeve 16 is connected to the friction shoes 18 coöperating with the fly wheel to regulate the speed of the shaft and the sleeve 17 is provided with beveled gears 19 and 20 which have their teeth disposed in opposite directions, this sleeve being capable of being shifted longitudinally on the sleeve 16 by means of a grooved extension 21 on the inner end of the sleeve which is engaged by the bifurcated or slotted end 22 of a twisted arm 23 of an angular or bell crank lever 24 which is pivoted at its angular portion on the boiler. The other arm 25 of the lever is connected by a rod 26 to an adjustable throw lever 27 the same being movable on a notched rack 28, preferably having three notches engageable by the spring dog 29 for holding the drive gear in its reverse positions or inoperative. Rotatably journaled vertically of one side of the boiler or body is a shaft 30 having a beveled pinion 31 disposed between the gears 19 and 20 and adapted when the latter are shifted through the means just described, to engage either of the gears and thereby imparting rotation to the shaft 30 in opposite directions at different times.

The reversing or opposite rotation imparted to the shaft 30 is employed for reversing the driving of the vehicle and for this purpose the lower end of the shaft 30 carries a pinion 32 engageable with the gear teeth 33 forming the beveled portion of a gear wheel 34 while the gear teeth 35 at the peripheral edge of said gear wheel engage the gear 36 carried by the adjacent drive wheel for imparting rotation to the latter. A shaft 37 connects with the gear 34 and carries on its opposite end a gear 38 meshing with a gear 39 secured to the opposite drive wheel whereby said drive wheels are simultaneously driven.

From the foregoing description in connection with the accompanying drawings, it will be evident that when the lever 27 is in a central position or engaged with the central notch of the rack, the gears 19 and 20 will be both disengaged from the pinion 31 but, should the lever be shifted forwardly the machine will be driven in one direction by engagement of the gear 19 with the pinion 31 and by shifting the lever rearwardly, the gear 20 will be moved into engagement with the pinion 31 causing a reversing of the direction in which the ground wheels are driven and consequently the direction in which the vehicle is propelled.

I claim:

1. In an engine reverse gearing, the combination with a driving shaft and a driven shaft, of a sleeve on the driving shaft, friction means connecting the shaft and sleeve to regulate the speed of rotation of the latter, a second sleeve splined on the first and having oppositely disposed spaced gears, a third shaft rotatably supported and a pinion at one end disposed between the said gears, a connection between the third shaft and the driven shaft and means for shifting the sleeve to cause either of the gears to mesh with the pinion.

2. In an engine reverse gearing, the combination with a drive shaft and driven shaft, of a fly wheel on the drive shaft, a sleeve rotatable on said shaft, friction arms carried by the sleeve and engaging the fly wheel upon lateral movement of the sleeve, means for laterally moving the sleeve, a second sleeve splined on the first and provided with oppositely disposed spaced gears, a third shaft rotatably supported and a pinion at one end disposed between the gears, means for shifting the last sleeve to cause either of the gears to mesh with the pinion and an operative connection between the third shaft and the driven shaft.

In testimony whereof, I affix my signature, in the presence of two witnesses.

IRA N. MITCHELL.

Witnesses:
A. BRISSON,
ALEX. MCKENZIE.

Copies of this patent may be obtained for five cents each, by addressing the "Commissioner of Patents, Washington, D. C."